US008616760B2

(12) United States Patent
Williams et al.

(10) Patent No.: US 8,616,760 B2
(45) Date of Patent: Dec. 31, 2013

(54) CONTROL SYSTEM FOR AND METHOD OF COMBINING MATERIALS

(75) Inventors: Roger Phillip Williams, Cincinnati, OH (US); Jon Kevin McLaughlin, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1447 days.

(21) Appl. No.: 11/895,420

(22) Filed: Aug. 24, 2007

(65) Prior Publication Data

US 2008/0031084 A1 Feb. 7, 2008

Related U.S. Application Data

(63) Continuation-in-part of application No. 11/217,273, filed on Sep. 1, 2005, now Pat. No. 8,240,908, and a continuation-in-part of application No. 11/217,802, filed on Sep. 1, 2005, now abandoned.

(51) Int. Cl.
*B01F 15/02* (2006.01)

(52) U.S. Cl.
USPC ............................... 366/160.2; 366/162.1

(58) Field of Classification Search
USPC ................... 366/160.1, 160.2, 162.1
See application file for complete search history.

(56) References Cited

U.S. PATENT DOCUMENTS

| 2,927,871 | A | | 3/1960 | Kilheffer et al. | |
|---|---|---|---|---|---|
| 3,097,764 | A | * | 7/1963 | Loeser | 222/55 |
| 3,565,286 | A | * | 2/1971 | Latham, Jr. | 222/4 |
| 3,572,959 | A | * | 3/1971 | Shaughnessy | 415/30 |
| 3,674,177 | A | * | 7/1972 | Hawkins | 222/52 |
| 3,675,901 | A | | 7/1972 | Rion | |
| 3,847,375 | A | | 11/1974 | Kuerten et al. | |
| 3,882,799 | A | | 5/1975 | Sargent et al. | |
| 4,015,366 | A | | 4/1977 | Hall, III | |
| 4,170,319 | A | * | 10/1979 | Suh et al. | 222/134 |

(Continued)

FOREIGN PATENT DOCUMENTS

| EP | 0158442 A2 | 10/1985 |
|---|---|---|
| JP | 62-098001 A | 5/1987 |

(Continued)

OTHER PUBLICATIONS

Kissell, Thomas E., "Servomotor Applications", Servomotor Applications—Tutorial—Development Library—National Instruments, Industrial Electronics, Second Edition, Prentice Hall PTR, downloaded Jul. 14, 2005.

(Continued)

*Primary Examiner* — Tony G Soohoo
(74) *Attorney, Agent, or Firm* — Jeffrey V Bamber; Jerry J Yetter (57) ABSTRACT

An apparatus and method for combining multiple materials into a stream. The multiple materials may include both a major material and one or more minor materials. The minor materials are added using inlet tubes. The major and minor materials are added at transient or steady state flow rates, depending upon a command from a control signal. The apparatus and method utilize a control system which does not have flow control valves, flow control feedback loops or a dynamic mix tank. The actual flow rates track the commanded flow rates, but deviate by an error. The claimed arrangement provides a time-based error believed to be unobtainable in the prior art.

2 Claims, 10 Drawing Sheets

(56) References Cited

U.S. PATENT DOCUMENTS

| | | | |
|---|---|---|---|
| 4,209,258 A * | 6/1980 | Oakes | 366/138 |
| 4,222,448 A | 9/1980 | Sunkle et al. | |
| 4,264,212 A | 4/1981 | Tookey | |
| 4,328,549 A | 5/1982 | Avery | |
| 4,358,821 A * | 11/1982 | Niemi | 700/32 |
| 4,390,822 A * | 6/1983 | Wechsler | 318/114 |
| 4,493,286 A * | 1/1985 | Carson | 118/677 |
| 4,571,319 A | 2/1986 | Beluch et al. | |
| 4,586,825 A | 5/1986 | Hayatdavoudi | |
| 4,794,806 A | 1/1989 | Nicoli et al. | |
| 4,832,497 A | 5/1989 | Wentzel | |
| 4,859,071 A | 8/1989 | Woilles et al. | |
| 4,869,595 A | 9/1989 | Lang | |
| 5,011,293 A | 4/1991 | Roop et al. | |
| 5,071,257 A | 12/1991 | Hassenpath et al. | |
| 5,228,594 A * | 7/1993 | Aslin | 222/63 |
| 5,380,088 A | 1/1995 | Fleischli et al. | |
| 5,388,761 A | 2/1995 | Langeman | |
| 5,423,607 A | 6/1995 | Jones et al. | |
| 5,547,275 A | 8/1996 | Lillelund et al. | |
| 5,590,976 A | 1/1997 | Kilheffer et al. | |
| 5,701,066 A * | 12/1997 | Matsuura et al. | 318/808 |
| 5,818,719 A | 10/1998 | Brandon et al. | |
| 5,857,589 A * | 1/1999 | Cline et al. | 222/1 |
| 5,865,537 A | 2/1999 | Streiff et al. | |
| 5,908,240 A | 6/1999 | Hood | |
| 5,996,650 A | 12/1999 | Phallen et al. | |
| 6,113,256 A | 9/2000 | Bonissone et al. | |
| 6,120,172 A | 9/2000 | Chen et al. | |
| 6,170,979 B1 | 1/2001 | Smeaton | |
| 6,186,193 B1 | 2/2001 | Phallen et al. | |
| 6,220,747 B1 * | 4/2001 | Gosselin | 366/152.3 |
| 6,540,393 B1 | 4/2003 | Lyons et al. | |
| 6,550,960 B2 | 4/2003 | Catalfamo et al. | |
| 6,591,697 B2 * | 7/2003 | Henyan | 73/861.71 |
| 6,712,496 B2 | 3/2004 | Kressin et al. | |
| 6,740,281 B2 | 5/2004 | Pinyayev et al. | |
| 6,743,006 B2 | 6/2004 | Jaffer et al. | |
| 6,793,192 B2 | 9/2004 | Verbrugge | |
| 6,799,882 B2 | 10/2004 | Childers et al. | |
| 6,863,475 B2 | 3/2005 | DeVaull, III et al. | |
| 6,923,568 B2 | 8/2005 | Wilmer et al. | |
| 2002/0048213 A1 | 4/2002 | Wilmer et al. | |
| 2003/0125831 A1 | 7/2003 | Toyozawa et al. | |
| 2003/0129062 A1 * | 7/2003 | Sabini et al. | 417/22 |
| 2004/0057334 A1 | 3/2004 | Wilmer et al. | |
| 2004/0100860 A1 | 5/2004 | Wilmer et al. | |
| 2004/0115230 A1 | 6/2004 | Divone et al. | |
| 2004/0116539 A1 | 6/2004 | Biercevicz et al. | |
| 2005/0008727 A1 | 1/2005 | Danules et al. | |
| 2005/0151502 A1 * | 7/2005 | Quirion | 318/715 |
| 2007/0044824 A1 | 3/2007 | Capeci et al. | |
| 2007/0047383 A1 | 3/2007 | Williams et al. | |
| 2007/0047384 A1 | 3/2007 | Williams et al. | |
| 2007/0212210 A1 * | 9/2007 | Kernan et al. | 415/1 |
| 2008/0031084 A1 * | 2/2008 | Williams et al. | 366/160.5 |
| 2008/0031085 A1 | 2/2008 | McLaughlin et al. | |

FOREIGN PATENT DOCUMENTS

| | | |
|---|---|---|
| WO | WO 00/63758 A1 | 10/2000 |
| WO | WO 01/52009 A1 | 7/2001 |
| WO | WO 2004/009224 A1 | 1/2004 |
| WO | WO 2004/108263 A1 | 12/2004 |
| WO | WO-2004/108263 A1 | 12/2004 |

OTHER PUBLICATIONS www.bran-Luebbe.de, Novados—A superlative selection of Metering Pumps, downloaded Jul. 28, 2005.

Scheiber, Steve, "Mixer-Dispenser Redesign Automates Changeover" and "Automatic Process Control, Inc., The Mark XV & XX Hydrospenser," downloaded Aug. 29, 2005.

PCT International Search Report, Apr. 5, 2007, 9 pages.

* cited by examiner

CONTROL SYSTEM FOR AND METHOD OF COMBINING MATERIALS

CROSS REFERENCE TO RELATED APPLICATIONS

This application is a continuation-in-part of U.S. patent application Ser. Nos. 11/217,273, now U.S. Pat. No. 8,240,908, and 11/217,802, now abandoned, and both filed Sep. 1, 2005.

FIELD OF THE INVENTION

The present invention relates to a method and control system for combining materials.

BACKGROUND OF THE INVENTION

Many methods are known in the art for combining fluid materials. Typically, the materials are combined upstream of a mix tank. Such materials are then jointly added to the mix tank and stirred until a homogenous blend is achieved. Further processing steps downstream of the confluence region may include the addition of more material(s), the addition or removal of energy, such as thermal energy, etc.

Additionally or alternatively, such materials can be mixed in a dynamic mix tank using mechanical agitation and/or alternative forms of agitation, such as ultrasonic vibration. The combined materials, or blend, may then be transported downstream and become an intermediate for further processing. Alternatively, these materials may be added to a container for ultimate sale or use.

The prior art methods and systems have several disadvantages. If such a mix tank is used, it can require considerable energy to achieve the desired mixing. If one desires to change the formulation, or even the minor materials, this change usually entails cleaning the entire tank and associated system. Cleaning the entire system can be time-consuming and laborious. Then new materials are added and the process begins again. Considerable waste of time and materials can occur.

Transients from no production or low rate production to full production rates are inevitable when changes between different products occur, etc. It is generally desirable that such a transient be over and steady state operation resume as quickly as possible. This is because one typically desires reaching steady state production rates as soon as reasonably practicable. Furthermore, product manufactured out of specification during transients may be wasted. If one were to accept a slower transient, then it is likely greater accuracy in the products manufactured during the transient can occur and less product may be wasted by having a slower transient. Thus a tradeoff is present in the art.

Often, the speed in which a system and respond to transients is limited by the hardware. For example, a flow meter which is intended to provide actual flow rate at a particular point in time may not follow and/or indicate a change in flow rate as quickly as one would like for the rate of change of the transient. For example, valves which provide flow control and ultimately the rate of material addition may not respond as quickly as one would desire. Furthermore, different sizes of valves, different operators used in conjunction with the valves, and even valves from different manufacturers may respond at different rates once a command signal is received. Yet further, the same valve may respond at different rates over different portions of the open/close cycle.

Accordingly, what is needed is an apparatus, and process of using such apparatus, which allows for quickly changing the formulation of a blend, accurately follows transients, minimizes wasted materials, and rapidly provides for homogeneity in the blend. Unless otherwise stated, all times expressed herein are in seconds, proportions and percentages herein are based on volume. Optionally, the invention may use proportions and percentages based on mass.

SUMMARY OF THE INVENTION

The invention comprises an apparatus for combining materials to make a combination. The materials may include at least one major material and at least one minor material. The major and minor materials are combined in a confluence region. The confluence region has an inlet for supplying each major material and one or more inlets for supplying each minor material. The combined materials are discharged from the confluence region through a common outlet, without the use of a mix tank, flow control valve or flow control feedback loop between the inlets and the common outlet.

In another embodiment, the invention comprises a method for blending together two or more materials. The method comprises the steps of providing a first material and at least one additional material, then combining these materials in a predetermined proportion. The materials may be combined at differing flow rates, while maintaining the predetermined proportion within a relatively tight tolerance.

DETAILED DESCRIPTION OF THE INVENTION

Figure 1:
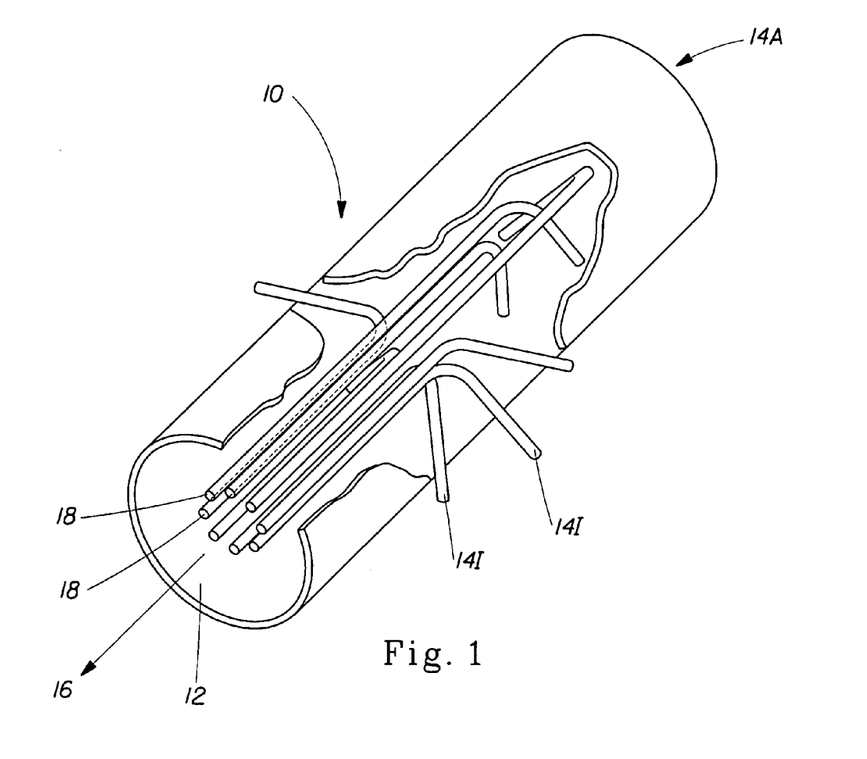
FIG. 1 is a schematic view of an exemplary system according to the present invention, shown partially in cutaway and providing for eight minor materials.
Figure 2:
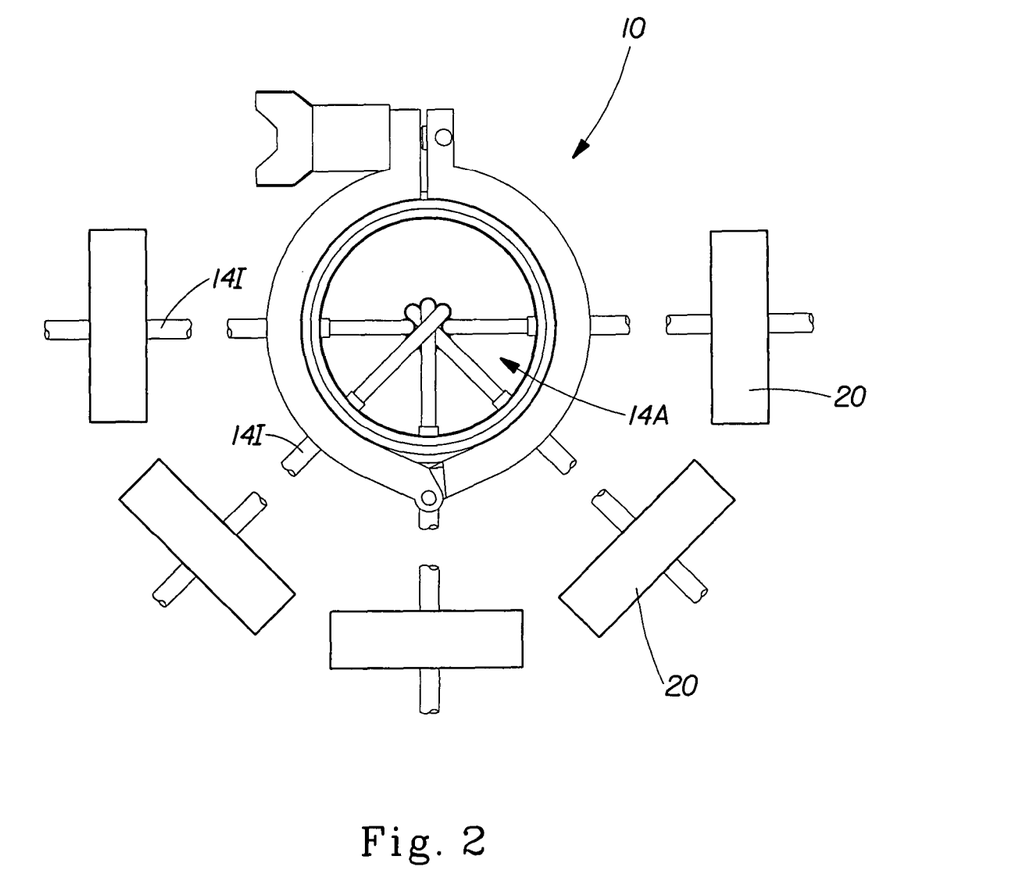
FIG. 2 is an instantaneous vertical sectional view of an exemplary system according to the present invention, schematically pumps for supplying the minor materials to the confluence region and a circumferential clamp therearound.

Referring to FIGS. 1-2, the invention comprises an apparatus 10 and process for combining, blending or mixing two or more materials. Combining refers to adding materials together with or without substantial mixing towards achieving homogeneity. Mixing and blending interchangeably refer to combining and further achieving a relatively greater degree of homogeneity thereafter.

The resulting combination of materials may be disposed in a container (not shown). The container may be insertable into and removable from the apparatus 10. The apparatus 10 comprises apparatus 10 hardware for adding at least one major or first material to the container and for adding at least one minor or second through nth materials to the container. The apparatus 10 for adding the major material(s) and minor material(s) provides for some or all of these materials to come together in a confluence region 12. The confluence region 12 is the region or point where the major material(s) and at least one, and likely each, of the minor material(s) initially come into contacting relationship with one another and is where mixing may occur. Mixing of the major material(s) and minor material(s) may occur at the confluence region 12, downstream thereof, or both.

The confluence region 12 may comprise one or more inlets 14A, which may be referred to as a major material inlet 14A, for supplying one or more major materials, and at least one inlet 14I, each of which may be referred to as a minor material inlet 14I, for supplying one or more minor materials. The confluence region 12 may further comprise at least one common outlet 16 for discharging the major material(s) and minor material(s) from the confluence region 12, and optionally directly into the container or optionally to the container after further processing. It is understood that after the materials leave the confluence region 12 through the common outlet 16, a single container may be filled or plural containers having equal or unequal volumes and flow rates thereinto may be filled in parallel.

The apparatus 10 for supplying the minor material(s) may comprise one or more inlet tube(s) 14I inserted into the apparatus 10 for supplying the minor material(s) directly to the confluence region 12. Each minor material may have a dedicated inlet tube 14I or, alternatively, plural minor materials may be inserted through a single inlet tube 14I. Of course, if desired, the same minor material may be added through more than one inlet tube 14I, in various combinations of like or different materials, quantities, feed rates, flow rates, concentrations, temperatures, etc.

The inlet 14I for each of the minor materials terminates at an inlet discharge 18. The inlet discharges 18 may lie in a common plane, as shown. The inlet discharge 18 defines the beginning of the confluence regions 12, as noted above. The inlet discharge 18 is the point a minor material leaves a respective inlet 14I and enters the confluence region 12. The inlet discharge 18 may be closely juxtaposed with an inline mixer, so that mixing of the materials occurs almost immediately in the confluence region 12.

While apparatus 10 having eight inlet tubes 14I, each equally spaced from the other, are illustrated, one of skill will recognize the invention as not so limited. More or less inlet tubes 14I may be provided and be equally or unequally spaced circumferentially, radially, and/or longitudinally. Further, the inlet tubes 14I may have equal or unequal cross sectional areas, shapes, lengths and flow rates therethrough. The minor materials may be supplied to the inlet tubes 14I from one or more common sources or from different sources.

If desired, the volume of the inlet tubes 14I for the minor materials may be relatively small relative to the total volume of the entire apparatus 10. This relative sizing provides the benefit that less hysteresis in the system might occur, due to the small volume of the inlet tubes 14I between the pump 20, and the confluence region 12.

The apparatus 10 may comprise a plurality of supply lines for the minor materials. Each supply line may extend from the source of at least one major material or at least one minor material to a respective inlet discharge 18 within the confluence region 12.

The inlet discharge 18 may occur at the distal end of an inlet tube 14I. Each supply line thereby defines a volume from its respective material supply to its respective discharge within the confluence region 12. The at least on supply for adding at least one major material subtends a first volume extends from that material source to the common plane where the inlet discharges 18 occur. Each supply for adding each of said minor materials subtends a sub-volume. The sub-volumes are combined to yield a second volume. The first volume and the second volume are summed to yield a total volume. The second volume may comprise less than 20 percent, less than 10 percent, less than 5 percent or less than 3 percent of the total volume.

The first material may be injected into the confluence region 12 at a first velocity. The second through Nth materials may be injected into the confluence region 12 at a second velocity, a third velocity, . . . up to N velocities for N minor materials. The second through Nth velocities may be matched to, substantially the same as, or may be slightly different than the first velocity and each other. One or more of the minor materials may generally correspond with or be matched in flow velocity at the time of entry into the confluence region 12 to the velocity of the at least one major material(s) at that same cross-section of the confluence region 12. In one embodiment of the invention, any or all of the second through Nth velocities of the minor materials may be within ±50 percent, and may even be more closely matched to within ±25 percent, and may even be more closely matched to ±5 percent of the first velocity of the major material(s). This arrangement allows the minor materials to enter the flow as a continuous stream, without dribbling, and thereby promote better mixing. The discharge speed of the minor material into the flow stream is determined by a combination of the discharge orifice (if any) and the output of the pump 20 supplying that minor material. In a degenerate case, the first velocity may be identically matched to any or all of the second through Nth velocities.

If desired the apparatus 10 and method including the present invention may utilize plural confluence regions 12. The plural confluence regions 12 may be disposed in series, in parallel, or a combination thereof. The plural confluence regions 12 may be identical or different in any or all of their major materials, minor materials, proportions, flow rates, command signals, etc. Certain plural confluence regions 12 may be used to premix minor materials, major materials, or any combination thereof to be mixed with other materials in later—occurring in confluence regions 12.

The container may be the final receptacle for the combination of the major and minor materials after they are blended together and leave the confluence region 12. The container may be ultimately shipped and sold to the consumer, or may be used for transport and storage of the blend of major materials and minor materials as an intermediate.

The container may be moved into and out of the apparatus 10 under its own power, as occurs with a tanker truck container, may be moved by the apparatus 10 itself, or by an outside motive force. In a degenerate case, all of the minor materials are added to one major material at the same point, thereby defining the beginning of the confluence region 12. The end of the confluence region 12 is defined as the common outlet 16 therefrom. In a degenerate case, the common outlet 16 may be into atmospheric pressure conditions, such as into a container filled with air, into a vacuum, such as an evacuated container, or even into a pressurized container. The blend or other combination of materials may be held above atmospheric pressure from the confluence region 12 to the point of discharge into the container.

The container may be of any suitable size, geometry, configuration, number, etc. The volume of the container may range from a few cubic centimeters to at least the size of a railroad tanker. The container may be provided with a frangible or resealable closure as are well known in the art, and be made of any material suitable for containing the materials combined according to the present invention.

The end of the confluence region 12 can also be defined as that point at which substantial homogeneity is obtained and additional intermixing of the materials is insubstantial. Such a point may occur prior to discharge into a container. The length of the confluence region 12 is defined as the distance from the beginning of the confluence region 12 to the aforementioned common outlet 16. The volume of the confluence region 12 is the length multiplied by the cross-sectional area of the confluence region 12 therein. The length of the confluence region 12 may be relatively short compared to the inlet tubes 14I and other geometries in the system.

While a confluence region 12 of constant cross section is shown, one will realize the invention is not so limited. The invention may be of variable cross section, such as convergent, divergent, barrel-shaped Venturi-shaped, etc.

As used herein, a major material is the largest single material in the final combination and may refer to any one material which comprises more than 33 percent, and, in another embodiment, even more than 50 percent, and may even comprise more than 67 percent of the total composition. Equal volumes for plural major and minor materials are contemplated herein. In contrast, a minor material is any one material which may comprise less than or equal to 50 percent, in another embodiment 10 percent, in another embodiment less than 5 percent, and in still another embodiment less than 1 percent of the total composition. The invention also contemplates plural materials in equal and/or relatively equal proportions and/or flow rates.

The apparatus 10 for supplying the major material may comprise a pipe, conduit, open channel, or any other suitable apparatus 10 through which the materials may flow. While a round pipe is illustrated, the invention is not so limited. Any desired cross section, constant or variable, may be utilized.

The apparatus 10 and method described and claimed herein do not require a dynamic mix tank. As used herein, a mix tank refers to tanks, vats, vessels and reactors and is inclusive of the batch and continuous stir systems which use an impeller, jet mixing nozzle, a recirculating loop, gas percolation, or similar means of agitation to combine materials therein. It can be difficult to quickly and accurately follow and achieve desired transient flow rates using a dynamic mix tank. This is because flow stagnation and interruption may occur while materials are being combined in a dynamic mix tank. Different proportions of flow rates can occur and prevent the desired product formulation from being achieved. If the desired formulation is not achieved, product is wasted. Furthermore, the residence time often necessary to achieve mixing and axial dispersion of the materials requires energy and may be difficult to achieve with multiple additions of minor materials.

The apparatus 10 described and claimed herein may utilize an inline mixer. As used herein an inline mixer refers to a mixing device which does not impute macro-scale flow stagnation, or prevent a continuous flow through portion of the apparatus 10 having the inline mixer from occurring. One non-limiting type of inline mixer is, for example, an ultrasonic or cavitation type mixer. One such system is a Sonolator homogenizing system available from Sonic Corporation of Stratford, Conn. Another non-limiting type of inline mixer is a static mixer as known in the art and disclosed in U.S. Pat. No. 6,186,193 B1, issued Feb. 13, 2001 to Phallen et al. and in commonly assigned U.S. Pat. No. 6,550,960 B2, issued Apr. 22, 2003 to Catalfamo et al.; U.S. Pat. No. 6,740,281 B2, issued May 25, 2004 to Pinyayev et al.; U.S. Pat. No. 6,743,006 B2, issued Jun. 1, 2004 to Jaffer et al.; and U.S. Pat. No. 6,793,192 B2, issued Sep. 21, 2004 to Verbrugge. Further, if desired, static mixers or other inline mixers may be disposed in or with one or more of the inlet tubes 14A or upstream of the confluence region 12. Additionally, surge tanks may be used to provide more constant flow for materials combined by the apparatus 10 and method described and claimed herein. Additionally or alternatively a Zanker plate may be utilized.

The major and/or minor material(s) may comprise a fluid, typically a liquid, although gaseous major and minor materials are contemplated. The major and/or minor material(s) may include, but are not limited to suspensions, emulsions, slurries, pastes, gels, aqueous and nonaqueous materials, pure materials, blends of materials, etc.

Optionally, at least one of the major material(s) and one or more of the minor material(s) may comprise a solid, such as a granular or particulate substance. Granular or particulate materials may be added in any known fashion, including but not limited to that disclosed in commonly assigned U.S. Pat. No. 6,712,496 B2, issued Mar. 30, 2004 to Kressin et al.

While the invention is described below in non-limiting, exemplary terms of pumps 20 and servomotors, the invention is not so limited and may use any motive force or similar means for supplying the major and minor materials. A used herein motive force refers to any force used to provide energy which, in turn, is used to supply materials to the confluence region 12 and may include, without limitation, electric motors, gravity feeds, manual feeds, hydraulic feeds, pneumatic feeds, etc.

The at least one major material(s) and/or at least one minor material(s) may be supplied from a hopper, tank, reservoir, pump 20, such as a positive displacement pump 20, or other supply or source to the pipe, or other supply devices, as are known in the art and provide the desired accuracy for dosing such materials. The major material(s) and/or minor material(s) may be supplied via a pump 20, auger feed, or any other suitable means.

The apparatus 10 for providing the major and/or minor materials may comprise a plurality of positive displacement pumps 20. Each pump 20 may be driven by an associated motor, such as an AC motor or a servomotor. Each servomotor may be dedicated to a single pump 20 or optionally may drive plural pumps 20. This arrangement eliminates the necessity of having flow control valves, flow meters and associated flow control feedback loops as are used in the prior art.

As used herein, a flow control valve refers to a valve quantitatively used to allow a specific quantity or flow rate of material to pass thereby and is used to modulate actual flow rate. A flow control valve does not include an on-off valve which allows the process according to the present invention to qualitatively start or stop.

Figure 9:
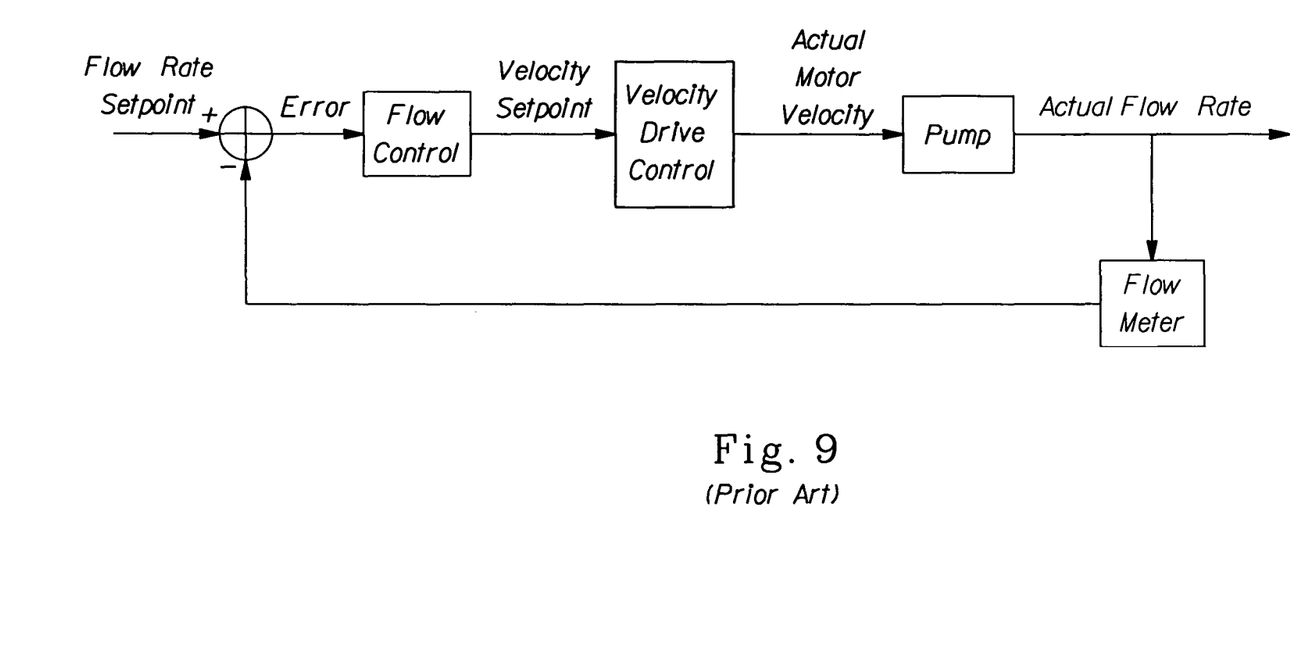
FIG. 9 is a schematic diagram of a flow rate feedback control system, according to the prior art.

Referring to FIG. 9, an illustrative flow control feedback loop according to the prior art is illustrated. A flow control feedback loop compares a flow rate set point, or command signal, to a measured flow rate. A subtraction is performed to determine an error. The error, in turn, is used to adjust or correct the velocity drive control. The velocity drive control is associated with a motor operatively connected to the pump 20 from which the actual flow rate is measured. This system has the disadvantage that the system response may be dictated by and constrained by the accuracy and response time of the flow meter.

Figure 10:
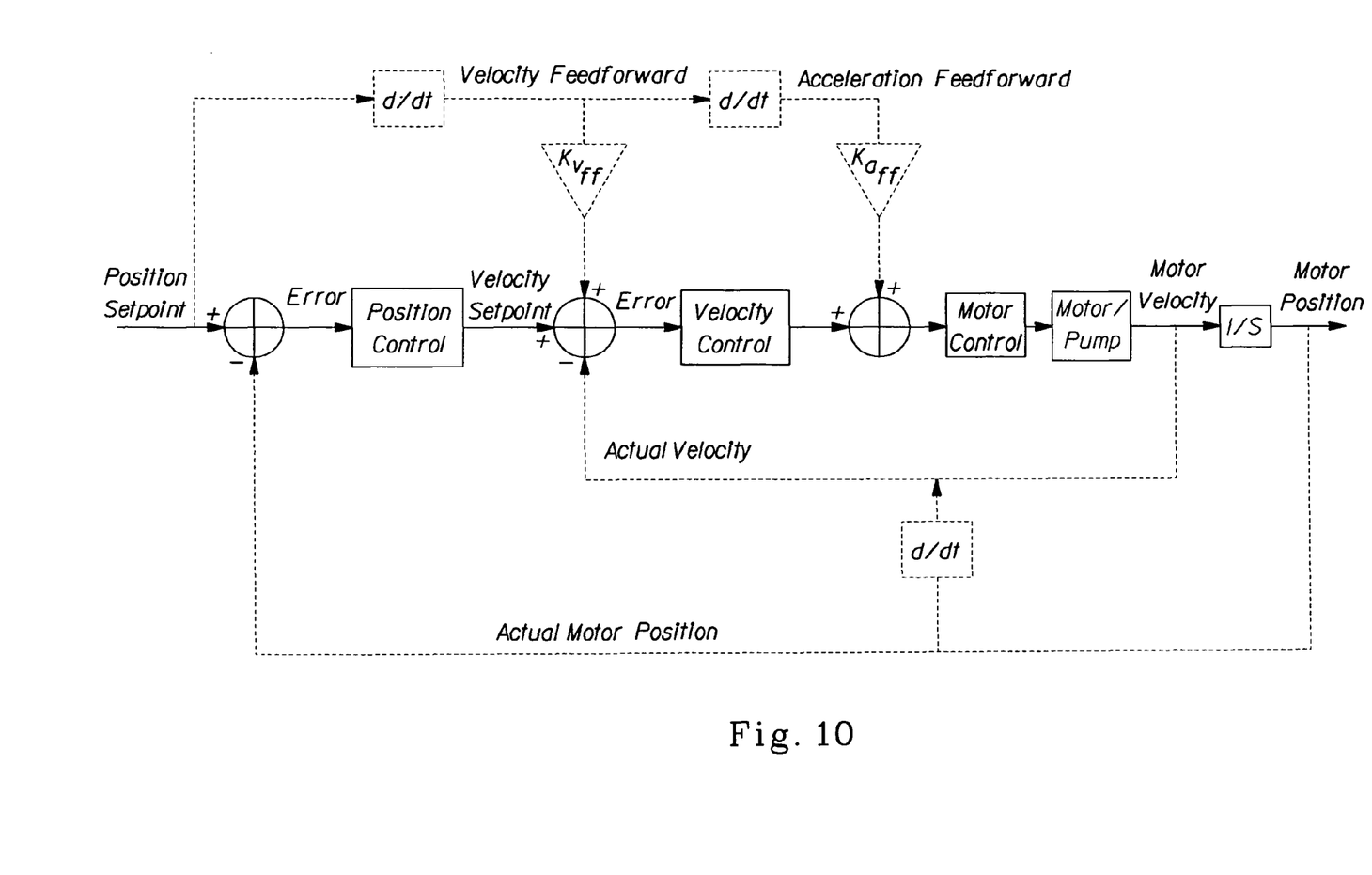
FIG. 10 is an exemplary schematic diagram of a motor position feedback control system usable with the present invention, showing optional components in dashed.

Referring to FIG. 10, a nonlimiting, exemplary motor control loop according to the present invention, is shown. Such a motor control loop may or may not comprise at least one of a feedforward loop and/or feedback loop, so long as the control system does not have zero gain in the position control or velocity control if the appropriate feedforward loops are not utilized.

If desired, the motor control loop may comprise nested control loops. The innermost of these loops may be a torque control feedback loop, which is shown as a single box scaling both torque and current. A torque command is input to the torque control. The torque control converts the torque command to an equivalent current command, which is input to the current controller for the motor. The current controller, in turn, provides a current feedback signal to the current control. However a torque control may be utilized, recognizing there it is a mathematical relationship between torque and current, which may be determined using a scaler. The torque control loop may be surrounded by a velocity control feedback loop, which, in turn, may be surrounded by a position control feedback loop. The velocity feedback control loop, the position feedback control loop and/or a feedforward path for velocity and/or acceleration are optional features for the present invention. The velocity and acceleration feed forward loop may utilize respective gains $K_{vff}$ and $K_{aff}$, as shown.

The derivative of the motor position with respect to time may be taken to yield motor velocity, or oppositely, the velocity feedback may be integrated with respect to time to yield motor position. The motor position control loop may use a motor position command signal and compare this set point or command signal to the motor position feedback to calculate position error. A velocity setpoint can be derived from the position error using the position controller.

The velocity setpoint may be compared to actual motor velocity to also determine a velocity error. This velocity error may be used to adjust the actual velocity of the motor, using known techniques. The motor velocity may then be correlated to pump 20 output, as is known in the art.

Optionally, the position setpoint may have its derivative taken with respect to time, to yield a feedforward velocity. The feedforward velocity may be input to the velocity setpoint summer and used in conjunction with the output of the position loop control to generate a velocity loop command signal. The feedforward velocity may also be used without taking into account the position loop control signal, in order to generate the velocity loop command signal. Optionally, the feedforward velocity may have its derivative taken to yield a feedforward acceleration. Likewise, the feedforward acceleration may be used in conjunction with, or without, the output of the velocity loop controller to determine the acceleration profile of the motor, which is proportional to the torque command signal issued to the motor.

The setpoints of the major and minor materials may be generated as a fraction or percentage of a master volumetric setpoint or command signal. The master volumetric setpoint may be defined in terms of total flow volume, flow rates, and/or time rate of change of flow rates.

While the foregoing discussion is directed to a motor control loop based on motor position, one of the skill will recognize the invention is not so limited. The motor control loop may be based on motor position, motor velocity, motor acceleration, motor current, motor voltage, torque etc. Such a control system and method may be used to define a master setpoint in terms of torque/current, position, velocity, and/or acceleration, providing there is a direct relationship between flow and torque/current/position/velocity/acceleration, as occurs with the present invention. The major and minor material setpoints may be input to the individual motive force systems as a command position and/or velocity and/or torque setpoint.

The motor position setpoint, or command signal, may be sent to one or more servomotors. According to the present invention, all of the major materials and minor materials may be driven in unison through such servomotors, each of which may be coupled to one or more pumps 20. Instead of or in addition to the pump 20/servomotor combination, one of ordinary skill may use a variable frequency drive to vary the voltage supplied to an AC motor-driven pump 20. Alternatively, or additionally, pump 20 output can be changed using various other means, as are known in the art. For example, to vary pump 20 output for a given motor, one could use a mechanical variable speed/adjustable speed drive, a multi-speed transmission/gearbox, and/or a hydraulic adjustable speed drive.

This arrangement provides the benefit that the flow rates of some or all of the major materials and minor materials can be ramped up or down in unison without requiring a common drive or flow control valves, providing greater fidelity to the desired formulation of the final blend of all materials. Thus, if one desires to have a step change, a ramp change either up or down, or even a start/stop in one or more flow rates, this transient can be accommodated more quickly than according to the prior art known to the inventors. Thus, the proportion of major and minor materials remains within a relatively tight tolerance of the desired formulation without unduly disrupting or unduly decreasing a flow rate usable for production quantities.

As noted above, this arrangement provides the benefit that it is not necessary to have a control loop directly monitoring flow rates. Instead, the flow rates for the major and minor materials may be determined by knowledge of the pump 20 characteristics for a given fluid viscosity, pump 20 type, and inlet/outlet pressure differential. Based on a desired flowrate, pump 20 compensation algorithms may be used to achieve accurate flow rate delivery without requiring direct flow measurement. Direct flow measurement may introduce delays and inaccuracies during high-speed transient response due to limitations inherent in the instrumentation, system hysteresis, etc.

The pump 20 may be driven to its desired rotational speed depending upon pump 20 capacity, including any motor or pump 20 slip factor to account for the pump 20 operating at less than 100 percent efficiency. If desired, the apparatus 10 and method according to the present invention may monitor torque, position, velocity and/or acceleration of the motor shaft.

Thus, an apparatus 10 and method according to the present invention might not have a flow feedback loop to compensate for variations in flow rate or even a flow meter to monitor the addition and/or rate of addition of the individual major or minor materials, for example, as they are added to the confluence region 12. Such a control system provides a relatively high degree of fidelity to the desired, i.e. commanded, response.

The apparatus 10 and method claimed herein may be controlled by a command signal as is known in the art. The command signal may be considered to be a dynamic setpoint, and is the target rate of material addition for each material at a given point in time. The command signal may be sent from a computer, such as a PLC. The signal from the PLC may be sent to a motor drive system. The PLC and drive system may be internal or external to the system under consideration.

If desired, each motor may have a dedicated drive controller. The command signal(s) is/are sent from the computer to the drive controller and then to the motor, which may be a servomotor. Of course, one of skill will recognize that other apparatus 10 and means for adding the materials may be utilized and the command signal sent from the controller to such apparatus 10 or means of material addition. Upon receipt of the command signal, the servomotor accelerates or decelerates to the specified rotational speed for its associated pump 20 or other apparatus 10 or means of material addition. The rate of material addition is thereby controlled from the command signal.

Two types of tracking error may be considered with the present invention. Tracking error is the difference between the value of a command signal and a process variable. The first is the instantaneous tracking error given in volume of material transferred per unit time. The instantaneous error measures the difference between any process variable and the command signal at a specific point in time.

The second tracking error one may consider the cumulative error. The cumulative error is the sum of each instantaneous error for each material under consideration throughout a specific period of time and is measured in volume. The period of time under consideration will depend upon the length of the transient.

Figure 3:
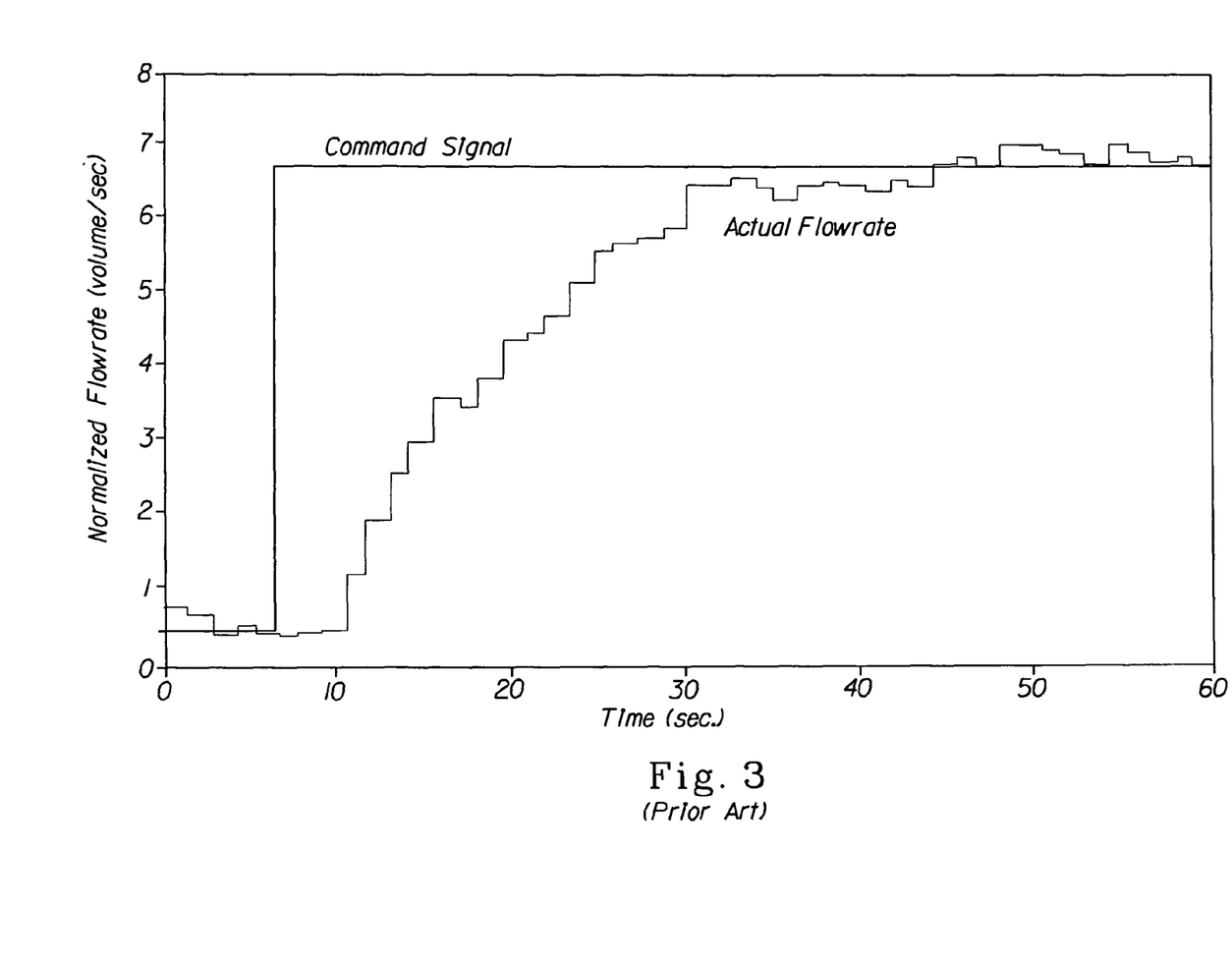
FIG. 3 is a graph showing the performance curve of an illustrative system according to the prior art for a command signal having a step input.
Figure 4:
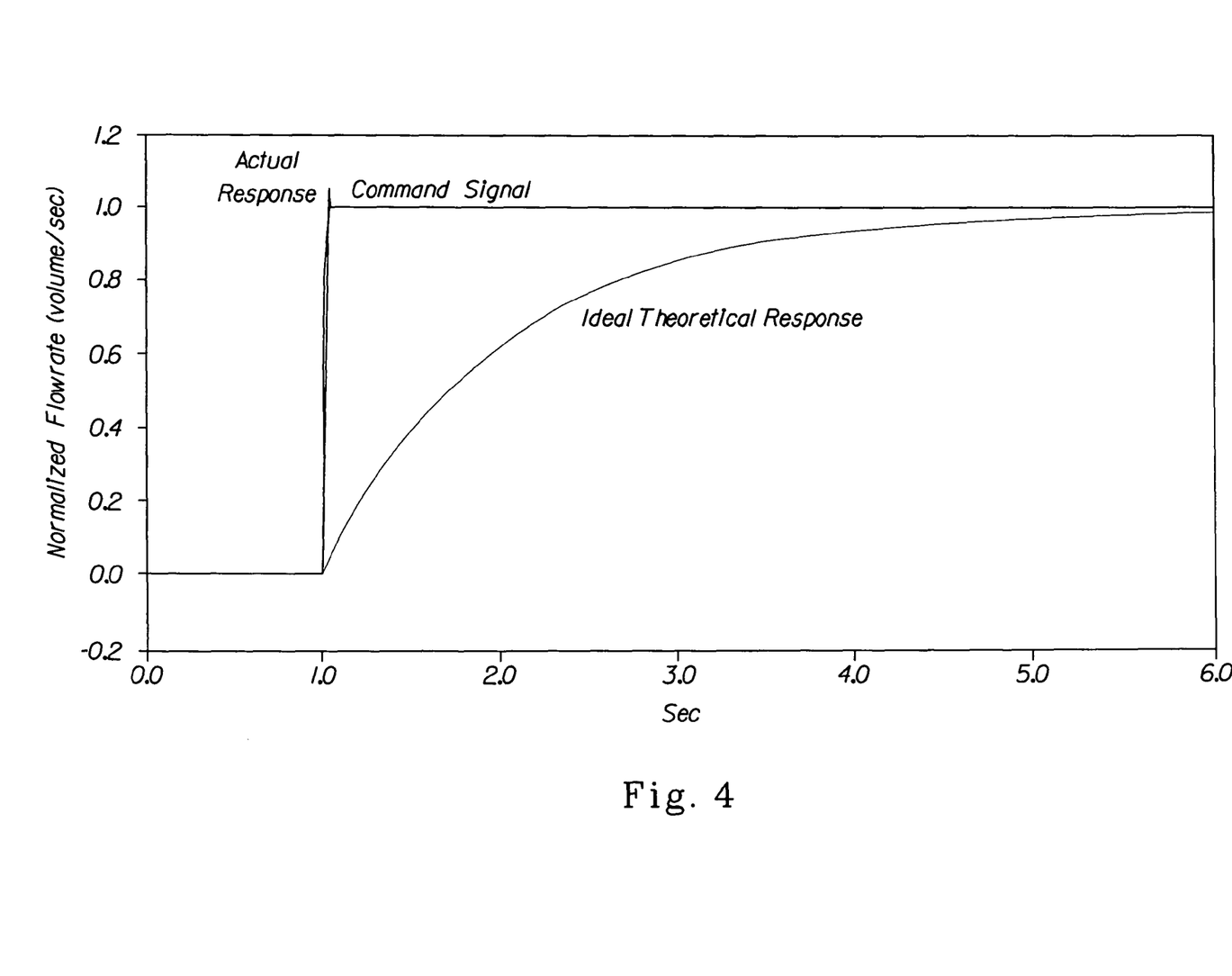
FIG. 4 is a graph showing a transient response curve of an exemplary system according to the present invention for a step input, as compared to an idealized theoretical response of the prior art for the same step input.

Referring to FIGS. 3 and 4, the tracking error shown is the difference between the command signal and a feedback process variable. In FIG. 3, the particular feedback process variable is the actual flowrate measured by a flowmeter for purposes of benchmarking. However, according to the present invention, a flowmeter is not necessary for production of material combinations, mixtures or blends.

FIG. 3 particularly shows the performance of one system according to the prior art. This system had a pipe with a nominal diameter of 5.1 cm. Flow was controlled by a flow control ball valve available from Fisher Controls, a division of Emerson of St. Louis, Mo. The valve was controlled by an Allen-Bradley ControLogix 1756-5550 controller. The controller relayed signals to the control valve based upon measured flow rate. Flow rate was measured by a Micro Motion CMF100 ELITE mass flow meter with an RFT 9739 transmitter, also available from Emerson. The system used water at a pressure of approximately 10 bar in response to a step input. Examination of FIG. 3 shows that the system took approximately 40 seconds to reach steady state conditions.

FIG. 4 shows the ideal theoretical response to a step input using a control valve. The command signal shows a step input. The response is calculated according to the formula: $g(t)=1-e^{-t/\tau}$ using a one second time constant ($\tau$). Even under such favorable theoretical conditions, FIG. 4 shows that it may take approximately four time constants, and therefore four seconds in this example, to reach steady state conditions.

FIG. 4 also shows that for a step input, steady state conditions according to the present invention may be reached in less than 0.1 seconds. The system according to the present invention in FIG. 4 utilized a command signal from an Allen Bradley ControLogix 1756-L61 processor communicating via a Sercos 1756-M16SE communication card to an Allen Bradley Kinetix 6000 drive system for the minor material. The minor material, a dye solution, was supplied by a Zenith C-9000 pump available from the Colfax Pump Group of Monroe, N.C. and driven by an Allen Bradley MPF-B330P servomotor. The servomotor had a dedicated Sercos Rack K6000 drive. The servo motor and the pump 20 were connected through an Alpha Gear SP+ drive available from Alpha Gear of Alpha Gear Drives, Inc. of Elk Grove Village, Ill.

As shown in FIGS. 3-4, in the prior art, low tracking error and relatively constant proportions of materials were difficult to achieve with a step change or with a sharp ramp change. This is because not all of the valves, actuators, etc., could respond simultaneously, in synchronization, and in the same proportion during these rapid change conditions. However, with the present invention and the absence of valves, particularly flow control valves, dynamic mix tanks, the associated hysteresis, etc., greater fidelity of response to the command signal can be achieved.

Figure 5:
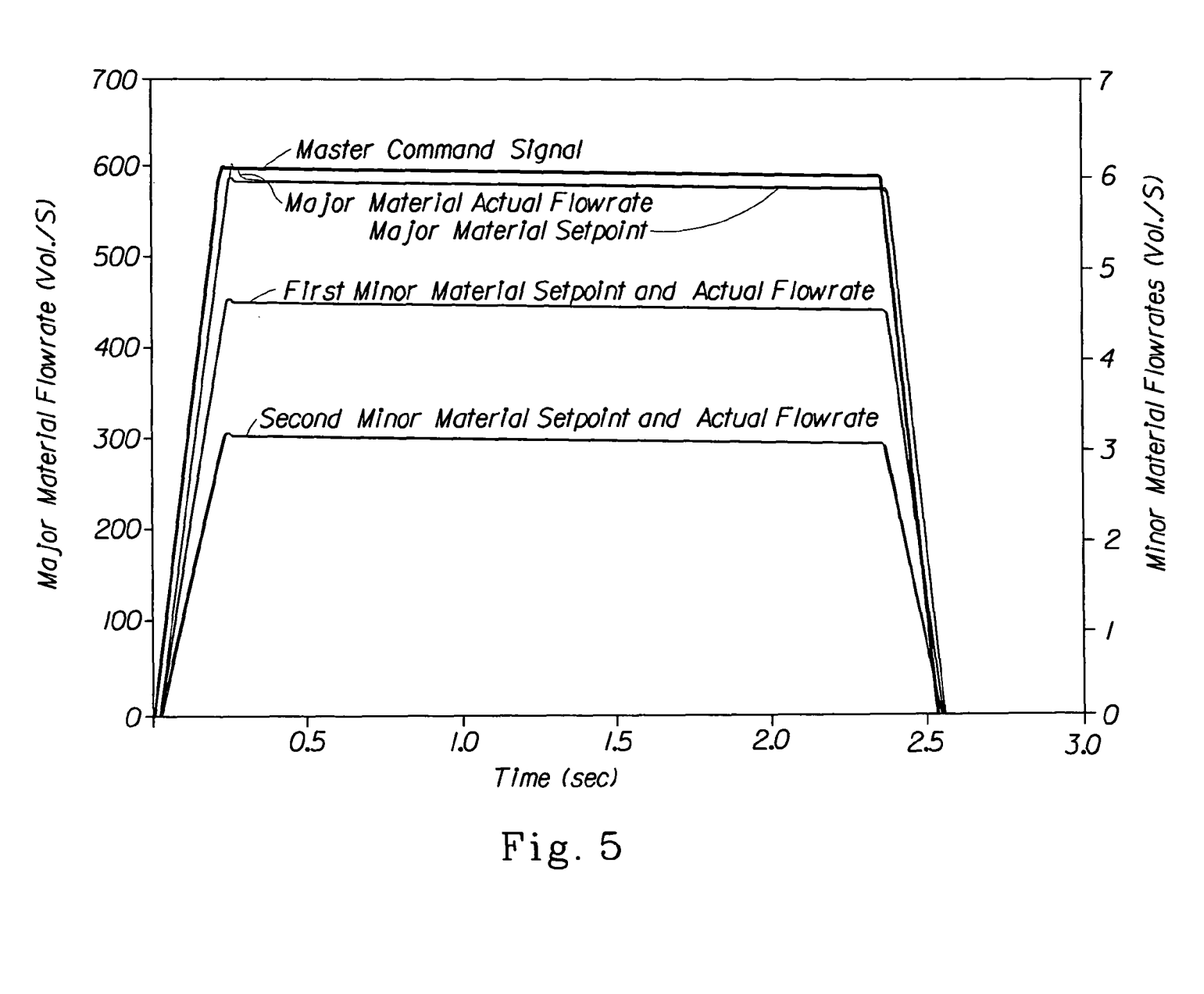
FIG. 5 is a graph of transient response curves of a system for a 0.2 second ramp input showing the command signal and certain process variables for one major and two minor materials.
Figure 6:
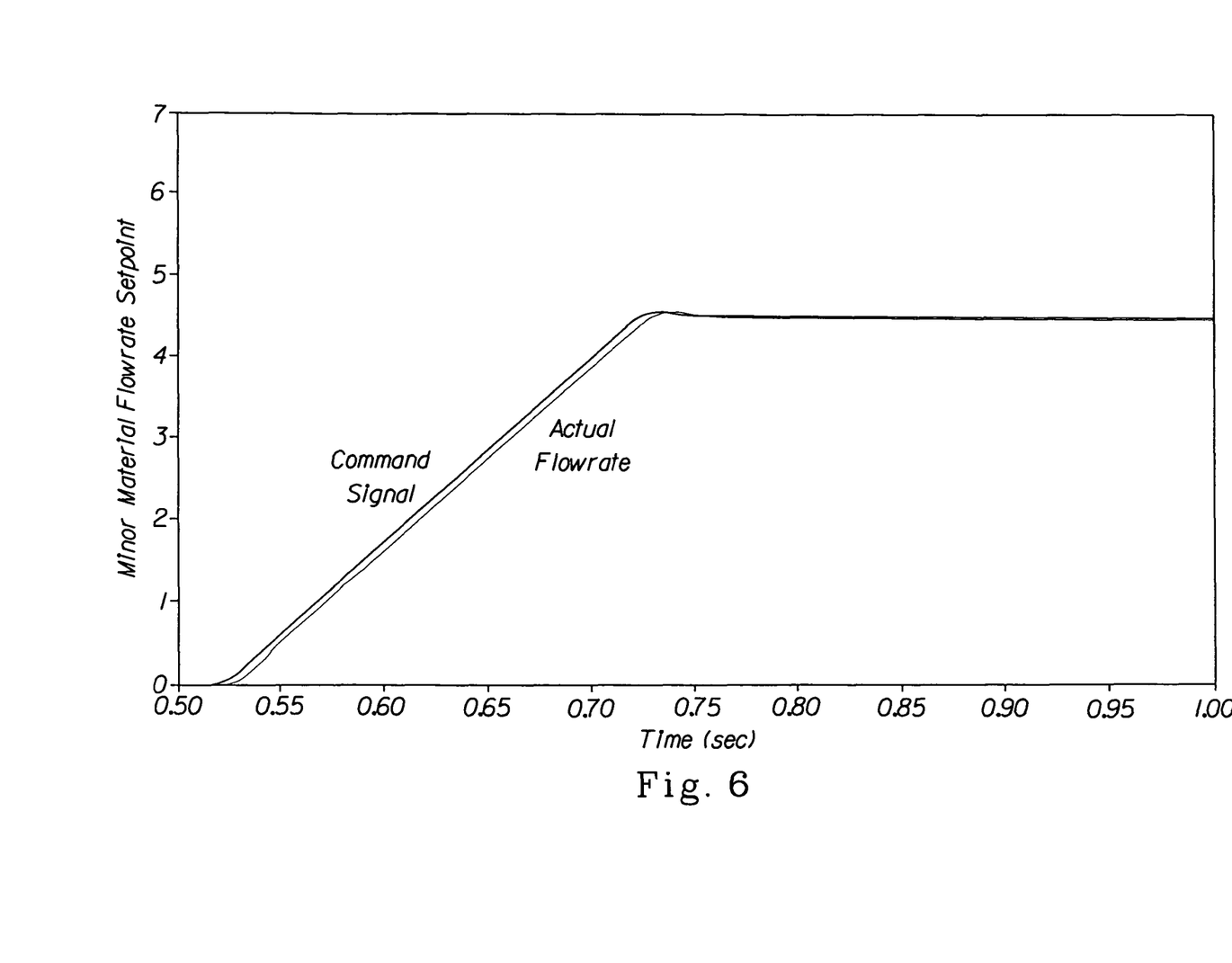
FIG. 6 is an enlarged graph of the transient response curve of one of the minor materials in FIG. 5.

One transient which may be considered is from the start of flow, or the start of a change in flow rate command, to the point at which steady state operation is achieved. Such a transient is shown in FIGS. 5-6. FIGS. 5-6 were generated with a system according to the present invention. This system had a horizontally disposed, 5.1 cm diameter confluence region 12 with a constant cross section. The confluence region 12 had eight inlets 14I, each with an inner diameter of 3 mm, disposed on a diameter of 1.5 cm as shown in FIGS. 1-2, although only two inlets 14I were utilized for this example.

The major material comprised a liquid soap mixture. The first and second minor materials comprised two different dye solutions. The major material, first minor material and second minor material were set to the desired proportions of 98.75, 0.75, and 0.5 percent respectively. The actual command signal issued to the servomotor control may be adjusted in accordance with known pump 20 compensation algorithms to account for the common pump 20 inefficiencies and irregularities.

The major material was supplied by a Waukesha UII-060 pump available from SPX Corp. of Delavan, Wis. and driven by an Allen Bradley MPF-B540K servomotor. Each minor material was supplied by a Zenith C-9000 pump available from the Colfax Pump Group of Monroe, N.C. and driven by an Allen Bradley MPF-B330P servomotor. Each servomotor had a dedicated Sercos Rack K6000 drive and was connected through an Alpha Gear SP+ drive available from Alpha Gear of Alpha Gear Drives, Inc. of Elk Grove Village, Ill. The system was controlled by an Allen Bradley ControLogix 1756-L61 processor communicating via a Sercos 1756-M16SE communication card to an Allen Bradley Ultra 3000 or Allen Bradley Kinetix 6000 drive system for the major and minor materials, respectively.

A fourteen element SMX static mixer available from Sulzer was disposed within approximately one mm of the start of the confluence region 12. A twelve element SMX static mixer was disposed approximately 46 cm downstream of the first static mixer. The materials were considered to be adequately mixed after the second static mixer.

As shown by FIGS. 5-6 the present invention may be used with transients having various increasing flow rates, various decreasing flow rates, or with steady state operation at various constant rates. The curve illustrated in FIG. 5 can be divided into three generally distinct segments. The first segment of the curve is the ramp-up where flow rates of each of the materials increases from zero to a predetermined value for each material. The second portion of the curve is the steady state flow, wherein the flow rates are maintained relatively constant and may be usable for production quantities. The third portion of the curve shows the ramp-down from the steady state flow rate to a lesser flow rate. The lesser flow rate may be zero, in the degenerate case, or it may be a flow rate which is simply less than that shown in the other portions of the curve. Throughout all three portions of these curves the proportion of each material to the total of the blend of all materials in the feed is maintained substantially constant.

In one embodiment the command signal may be for a transient to go from a no flow or zero flow signal to a signal of 100 percent of full scale flow in a single transient although steady state flow rates of less than 100 percent may be utilized. The transient may be commanded to occur in not more than 2 seconds, not more than one second, not more than one-half second or less. During such a transient, according the present invention, each major or minor material, i.e. first, second third . . . nth material, may remain within ±10 percent, 5 percent, 3 percent or 1 percent of measured full scale flow throughout the transient. The percentage may be based on the instantaneous error, described below.

Of course, one of ordinary skill will realize the invention is not limited to transients with only three different flow rates. The transition from a first steady state flow may be to a greater or lesser steady state flow rate. Multiple transitions, both increasing and decreasing in any combination, pattern, of equal or unequal time periods, ramps, etc., may be utilized as desired.

According to the present invention, the at least one first material and at least one second material occur in a generally constant proportion, i.e., constant flow relative rates into the confluence region 12 throughout the steady state operating period. Likewise, the substantially constant proportion is maintained throughout the transitional flow rate periods as well. The substantially constant proportion is maintained both as flow rates increase and decrease, so long as the flow rate is greater than a near zero, nontrivial value.

While a first order, linear rate of change throughout the transition regions is illustrated in FIGS. 5-6, the invention is not so limited. A second order, third order, etc., rate of change may also be utilized, so long as the substantially constant proportion is maintained. It is only necessary that the pumps 20, or other motive forces, be controlled in such a way that generally constant proportionality is maintained. While constant proportion may be more readily envisioned, and easier to execute and program utilizing a linear rate of change, one of skill will recognize other options are available to maintain the constant proportion throughout the transitions.

Referring back to the systems of FIGS. 3-4 and as illustrated by Table 1, which tabulates the data illustrated in FIG. 4, the instantaneous error according to the prior art decreases throughout the duration of the transient. However, this error never reaches the relatively low value of the present invention within the 5 second time period illustrated in Table 1. Table 1 also illustrates the cumulative error for both the prior art and present invention systems.

TABLE 1

|  | Time in seconds from start of command signal step. Command signal issued at T = 1 second. | | | | |
| --- | --- | --- | --- | --- | --- |
| Tracking Error | 0.1 sec. | 0.25 sec. | 0.50 sec. | 1 sec. | 5 sec. |
| INSTANTANEOUS ERROR (volume/sec) | | | | | |
| Prior Art | 0.905 | 0.779 | 0.607 | 0.369 | 0.009 |
| Present Invention | 0.002 | 0.002 | 0.002 | 0.002 | 0.002 |
| CUMULATIVE ERROR (volume) | | | | | |
| Prior Art | 0.089 | 0.215 | 0.386 | 0.624 | 0.990 |
| Present Invention | 0.006 | 0.006 | 0.006 | 0.007 | 0.015 |

Figure 7:
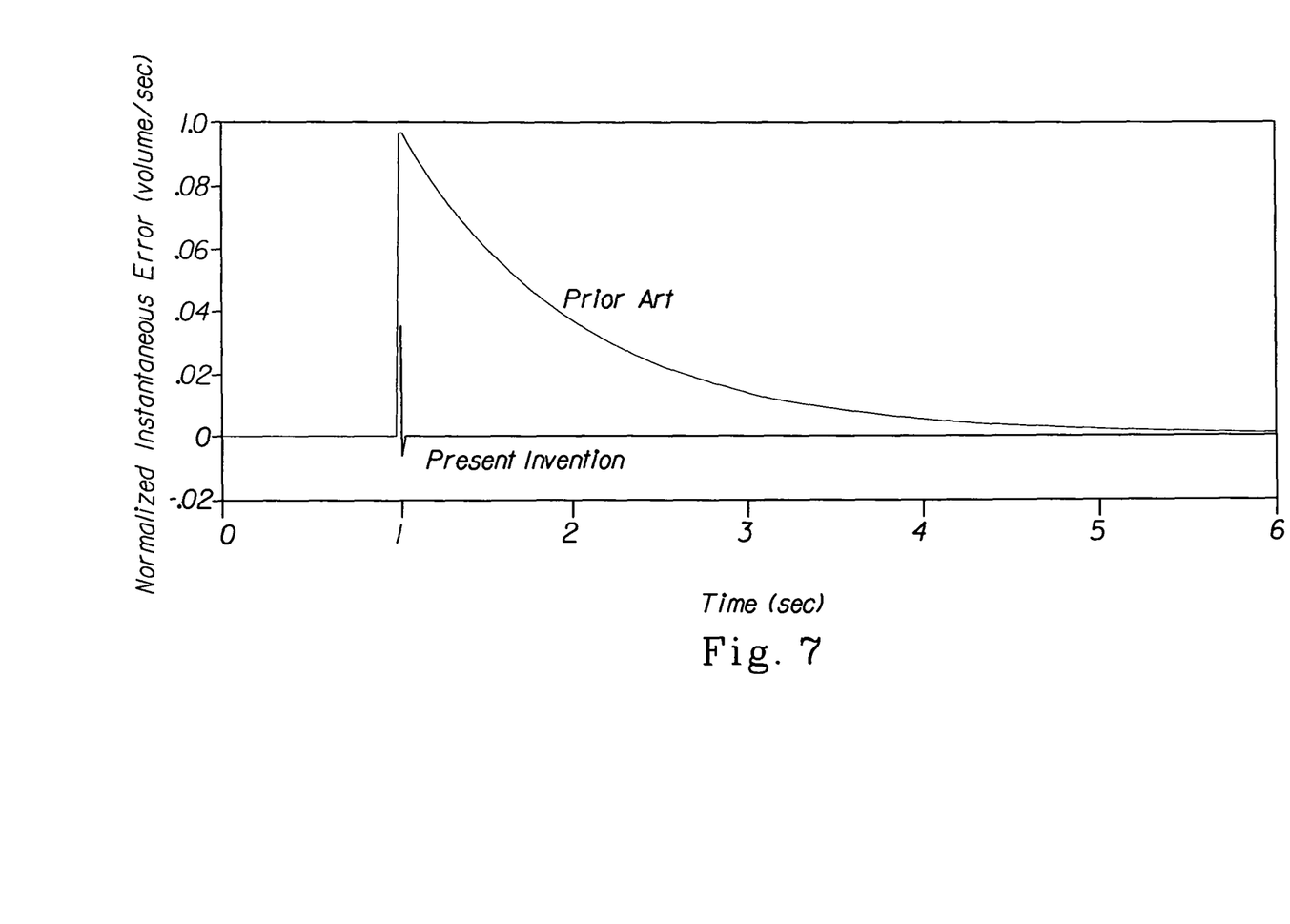
FIG. 7 is a graph showing the instantaneous error of the system of FIG. 4.

FIG. 7 illustrates that the instantaneous error can be approximated by the first order exponential equation:

$$IE = A*M*\exp(-t/\tau)$$

Where IE is the instantaneous error in volume per unit time, and

A is the magnitude of the setpoint change, normalized to unity for the present invention, M is a coefficient of the amplitude which reduces the value of the amplitude from the normalized unity setpoint magnitude to any value from 0 to 1, or from 0.1 to 1, or from 0.2 to 1 or from 0.3 to 1 or from 0.4 to 1 or from 0.5 to 1, as desired, t is the instantaneous time in seconds, $\tau$ is the time constant in seconds.

This approximation is particularly suitable for prior art transients lasting up to 1 second, 2 seconds, 3 seconds, 4 seconds and even 5 seconds. Illustrative, non-limiting combinations of the coefficient, time constant and time period under consideration are set forth in Table 2.

TABLE 2

| M | Tau | t(sec) |
| --- | --- | --- |
| 0.5 | 1.0 | 0-0.5*$\tau$ |
| 0.5 | 0.75 | 0-1.33*$\tau$ |
|  |  | 0-1*$\tau$ |
|  |  | 0-0.5*$\tau$ |
| 0.5 | 0.5 | 0-3*$\tau$ |
|  |  | 0-2*$\tau$ |
|  |  | 0-1*$\tau$ |
| 0.5 | 0.25 | 0-8*$\tau$ |
|  |  | 0-4*$\tau$ |
|  |  | 0-2*$\tau$ |
| 0.25 | 1.0 | 0-1.5*$\tau$ |
|  |  | 0-1*$\tau$ |
| 0.25 | 0.75 | 0-2*$\tau$ |
|  |  | 0-1*$\tau$ |
| 0.25 | 0.5 | 0-3*$\tau$ |
|  |  | 0-1.5*$\tau$ |
| 0.25 | 0.25 | 0-4*$\tau$ |
|  |  | 0-2*$\tau$ |

FIG. 7 further shows that the present invention may achieve an instantaneous error given by the following exemplary inequalities, although any of the combinations set forth in Table 2 or otherwise may be utilized.

$IE < A*M*\exp(-t/\tau)$ for values of M=0.5, $\tau$=1, evaluated from time t=0 to 0.5*$\tau$ or more particularly $IE < A*M*\exp(-t/\tau)$ for values of M=0.5, $\tau$=0.5, evaluated for t from 0 to 3.0*$\tau$ or more particularly $IE < A*M*\exp(-t/\tau)$ for values of M=0.25, $\tau$=1.0, evaluated for t from 0 to 1.5*$\tau$.

The instantaneous error can be integrated over a desired time period to yield a cumulative error for that period according to the formula $$CE = \int_{t_1}^{t_2} IE\, d(t)$$

Where CE is the cumulative error, $t_1$ is the starting time and set to 0 for the degenerate case, and $t_2$ is the end of the time period under consideration.

Figure 8:
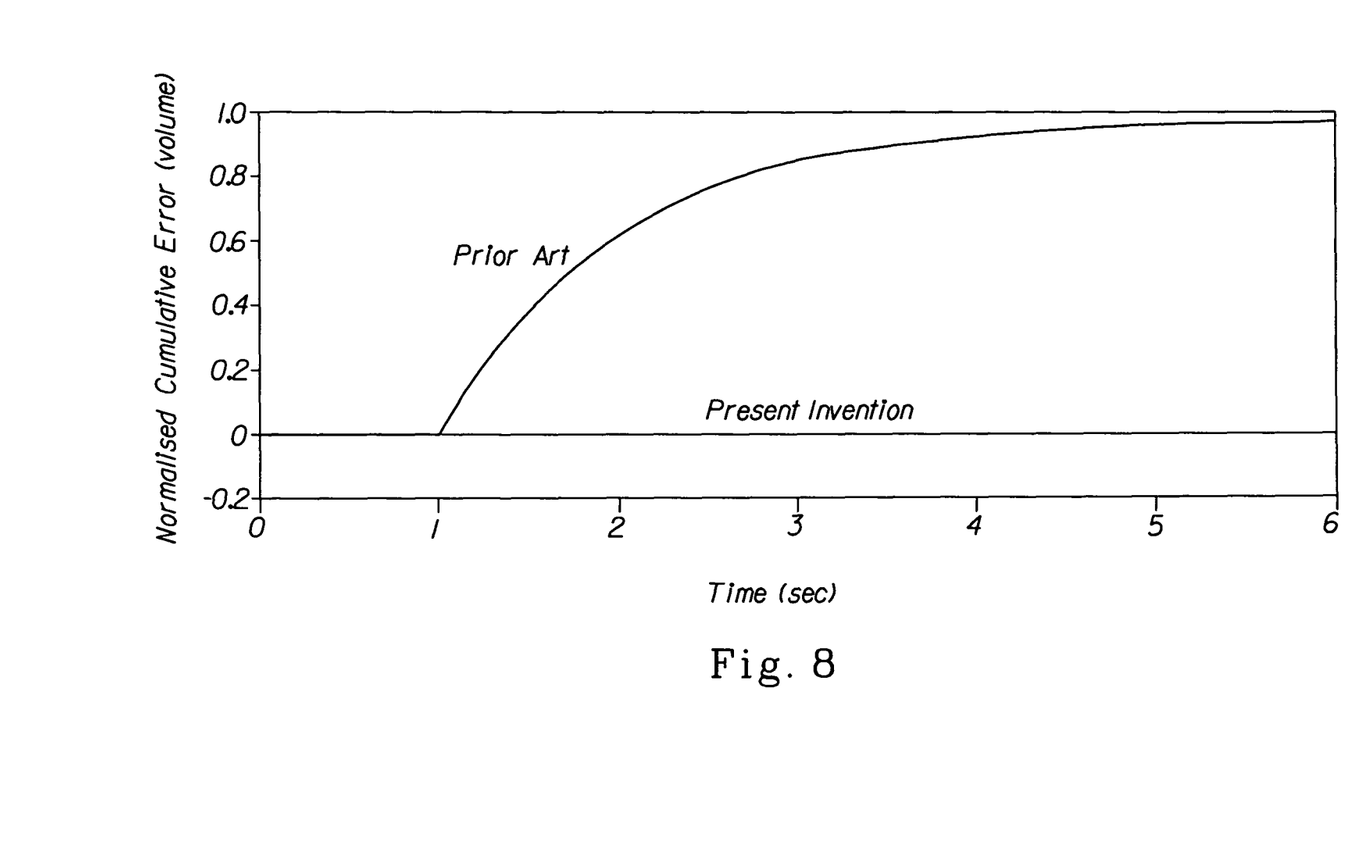
FIG. 8 is a graph showing the cumulative error of the system of FIG. 4.

FIG. 8 illustrates that the cumulative error according to the prior art can be approximated by the equation $$CE_k = (0.5*(IE_{k-1} + IE_k)*\Delta T) + CE_{k-1}$$

Where CE is the cumulative error in volume,
k is the index for the specific discrete time period,
ΔT is the discrete time sampling and period, in seconds, and
IE remains as previously defined.

However, one of skill will recognize that the instantaneous error approaches zero as time continues towards steady state flow. Since the cumulative error is dependent upon instantaneous error, the cumulative error will not significantly increase as the instantaneous error approaches zero. One of ordinary skill will recognize that any combination of values set forth in Table 2 may be utilized with the present invention, so that the invention is not limited to the above inequalities for instantaneous error or associated cumulative error.

If desired, one may utilize a piston pump with the present invention. A piston pump may provide more versatility with certain fluids which may be used in conjunction with the present invention, and also has a pulsating output which provides repeating fluctuations in the flow rate. If desired, one may program the servomotor to have a negative superposition with the actual pump output so that the fluctuations are dampened by using camming of the motor, as is known in the art. This provides the advantage that no dampener is necessary in the system downstream of the piston pump. The dampener may add hysteresis or other undesirable affects which are avoided according to the present invention.

An alternative embodiment of the invention is presented. In this embodiment, a small portion, which may be a minority portion, of the product stream is diverted. The diverted portion of the product may have all of the materials of the final product as desired. Alternatively, the diverted minority portion may be missing one or more materials.

The diverted minority portion of the product stream may have at least one material added using the apparatus 10 and method disclosed herein. The minor material may be added to the diverted stream immediately upstream of an ultrasonic horn, static mixer, etc. This portion of the stream is then usable as an intermediate or final product. This minority portion, having thus been completed, is then discharged into the container for ultimate use.

The majority portion of the stream may continue through the process unabated, without the further addition of a minor material, and without diversion. Alternatively, additional minor materials may be added to the major portion of the product stream. The major portion of the product stream is then sent to a container for ultimate use, as disclosed above.

This arrangement provides the benefit that parallel manufacture of a major product and a minor product may be simultaneously accomplished. For example, the major portion of the product may comprise a first die, perfume, additive, etc. A less popular or less often used minor portion of the product stream may be diverted and have a second die, perfume, or other additive included in the final product. Alternatively, this arrangement provides the benefit that the major portion of the product may be produced without a particular dye, perfume, additive, etc., while a desired dye, perfume, or other additive is included in the diverted stream of the minority product, or vice versa. This arrangement provides the benefit that both products may be produced in any desired proportion without costly shutdown, cleaning, etc.

Of course, one of skill will recognize that more than a single minority product stream may be diverted. Plural minority streams may be diverted, each producing a relatively small quantity of the final product with or without specific and other additives. This arrangement provides flexibility in the manufacturing process for producing a large or majority first quantity of a blend of materials and one or more relatively small, even very small, minority quantities of materials, all without shutting down and recleaning the apparatus 10 and associated systems.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A control system for an apparatus used for blending plural materials, said apparatus having no flow control valves or dynamic mix tanks, said materials being supplied to said apparatus from a plurality of supply lines at a target flow velocity of material additions from each material at a given point in time, said control system consisting of:
   a position control, said position control, being structured to receive a position setpoint and convert said position setpoint to a velocity setpoint;
   a velocity control structured to receive said velocity setpoint and convert said velocity setpoint to a motor control setpoint; and
   a motor coupled to a pump, said motor having a motor control structured to receive said motor control setpoint and convert said motor control setpoint to a command signal, said command signal governing the speed of said motor to blend said plural materials in a predetermined ratio without measuring the flow rate of any of said plural materials being blended in said ratio.

2. A control system for a blending apparatus, which blending apparatus consists of:
   at least one inlet for supplying at least one major material at a velocity;
   a plurality of inlet tubes for supplying a plurality of minor materials at a velocity;
   each said inlet for said at least one major material and each said inlet tube for each said minor material having a positive displacement pump associated therewith for supplying said respective major material or minor material, said pumps being driven by an associated motor and being operable independently of each other, each said inlet tube for said minor material terminating in an inlet tube discharge, each said discharge being in communication with a portion of said apparatus defining a confluence region, whereby said at least one major material and minor material can come together in a predetermined ratio within said confluence region;
   wherein at the confluence region there are:
      an inlet for supplying each said major material;

an inlet tube discharge for supplying each said minor materials said inlet tube discharges being non-opposing and being in a common plane; and a common outlet for discharging said at least one major material and said at least one major material and said at least one minor material combined together from said confluence region;

wherein said inlet for supplying said major material comprises a conduit having side walls defining an interior therebetween, wherein said major material flows through said conduit in a direction, and said at least one inlet tube for supplying said minor material has an inlet end outside of said conduit and said tube passes through the side wall of said conduit and has a discharge end inside of said conduit to form a common discharge, and whereby no mix tank, flow control feedback loop or flow control valves are used for maintaining said predetermined ratio, wherein the accuracy of the predetermined ratio is maintained by controlling the energy to the motors associated with the pumps, rather than by the combination of a flow meter and a flow control valve, to match the velocity of the minor materials to the velocity of the major material to within ±5%, thereby promoting better flow and mixing of said minor materials; said control system consisting of:

a position control, said position control, being structured to receive a position setpoint and convert said position setpoint to a velocity setpoint;

a velocity control structured to receive said velocity setpoint and convert said velocity set point to a motor control setpoint; and a motor control structured to receive said motor control setpoint and convert said motor control setpoint to a command signal, said command signal communicating with and governing the speed of said motor associated with said positive displacement pump.

* * * * *